United States Patent
Otto

(10) Patent No.: US 12,397,371 B2
(45) Date of Patent: Aug. 26, 2025

(54) METHOD FOR PRODUCING A WELDED COMPONENT CONSISTING OF A FORMED HIGH-STRENGTH STEEL, AND A COMPONENT PRODUCED IN THIS MANNER

(71) Applicant: Salzgitter Flachstahl GmbH, Salzgitter (DE)

(72) Inventor: Manuel Otto, Cremlingen (DE)

(73) Assignee: Salzgitter Flachstahl GmbH, Salzgitter (DE)

( * ) Notice: Subject to any disclaimer, the term of this patent is extended or adjusted under 35 U.S.C. 154(b) by 881 days.

(21) Appl. No.: 17/614,204

(22) PCT Filed: May 25, 2020

(86) PCT No.: PCT/EP2020/064399
§ 371 (c)(1),
(2) Date: Nov. 24, 2021

(87) PCT Pub. No.: WO2020/239671
PCT Pub. Date: Dec. 3, 2020

(65) Prior Publication Data
US 2022/0266389 A1   Aug. 25, 2022

(30) Foreign Application Priority Data
May 27, 2019  (DE) .......................... 102019114090.0

(51) Int. Cl.
*B23K 26/32* (2014.01)
*B23K 9/16* (2006.01)
(Continued)

(52) U.S. Cl.
CPC ................ *B23K 26/32* (2013.01); *B23K 9/16* (2013.01); *B23K 26/24* (2013.01); *C21D 8/0205* (2013.01);
(Continued)

(58) Field of Classification Search
CPC .... B23K 26/26; B23K 26/244; B23K 26/242; C22C 38/32; C22C 38/04; C22C 38/44
See application file for complete search history.

(56) References Cited

U.S. PATENT DOCUMENTS 6,210,806 B1 *  4/2001  Hidaka .................. C21D 6/002
                                                       428/472
6,228,183 B1 *  5/2001  Bangaru ................ C22C 38/04
                                                       420/106
(Continued)

FOREIGN PATENT DOCUMENTS

CN      109136762 A       1/2019
CN      109402499 A  *    3/2019
(Continued)

OTHER PUBLICATIONS

Preliminary Report on Patentability of the International Searching Authority in English from corresponding Patent Cooperation Treaty (PCT) Application No. PCT/EP2020/064399, completed Aug. 12, 2021.
(Continued)

*Primary Examiner* — Thien S Tran
(74) *Attorney, Agent, or Firm* — Gardner, Linn, Burkhart & Ondersma LLP

(57) ABSTRACT

A welded component having mechanical properties in a welding seam region comparable or better to those in the non-influenced base material via a method including producing a hot-rolled steel product made of a high-strength air-hardenable steel with a material thickness of at least 1.5 mm having a chemical composition by mass in one embodiment of: C: 0.03 to 0.4; Mn: 1.0 to 4.0; Si: 0.09 to 2.0; Al: 0.02 to 2.0; P<=0.1; S<=0.1; N: 0.001 to 0.5; Ti: 0.01 to 0.2; Cr: 0.05 to 2.0; B: 0.001 to 0.1; Mo: 0.01 to 1.0; V: 0.01 to 0.2; optionally: Ni: 0.02 to 1.0; Nb: 0.01 to 0.1; and residual iron including conventional steel-accompanying elements,
(Continued)

subsequently air hardening the produced hot-rolled steel product, then deforming the hot-rolled steel product in the air-hardened state to form a component, and producing welding connections using a fusion welding process on the component.

11 Claims, 4 Drawing Sheets

(51) Int. Cl.
*B23K 26/24* (2014.01)
*B23K 103/04* (2006.01)
*C21D 8/02* (2006.01)
*C21D 9/46* (2006.01)
*C22C 38/00* (2006.01)
*C22C 38/02* (2006.01)
*C22C 38/04* (2006.01)
*C22C 38/06* (2006.01)
*C22C 38/22* (2006.01)
*C22C 38/24* (2006.01)
*C22C 38/28* (2006.01)
*C22C 38/32* (2006.01)

(52) U.S. Cl.
CPC .............. *C21D 8/0226* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *C22C 38/24* (2013.01); *C22C 38/28* (2013.01); *C22C 38/32* (2013.01); *B23K 2103/04* (2018.08); *C21D 2211/002* (2013.01)

(56) References Cited

U.S. PATENT DOCUMENTS

| | | |
|---|---|---|
| 8,715,430 B2 | 5/2014 | Hara et al. |
| 2007/0267110 A1 | 11/2007 | Hansen et al. |
| 2009/0173412 A1 | 7/2009 | Schoettler et al. |
| 2011/0024006 A1 | 2/2011 | Schotter et al. |
| 2019/0084095 A1 | 3/2019 | Schöttler et al. |
| 2021/0156018 A1 | 5/2021 | Debeaux et al. |

FOREIGN PATENT DOCUMENTS

| | | |
|---|---|---|
| DE | 4446709 A1 | 6/1996 |
| DE | 10023488 A1 | 12/2000 |
| DE | 10221487 A1 | 9/2003 |
| DE | 102004053620 A1 | 5/2006 |
| DE | 102007058222 A1 | 6/2009 |
| DE | 102016104295 A1 | 9/2017 |
| EP | 0576107 B1 | 6/1995 |
| EP | 1881083 A1 | 1/2008 |
| KR | 20090103779 A | 10/2009 |
| RU | 2234542 C2 | 8/2004 |
| RU | 2686728 C1 | 4/2019 |
| WO | 9905336 A1 | 2/1999 |
| WO | 99285818 A1 | 6/1999 |
| WO | 2011000351 A1 | 1/2011 |

OTHER PUBLICATIONS

International Search Report of the International Searching Authority in English from corresponding Patent Cooperation Treaty (PCT) Application No. PCT/EP2020/064399, indicated completed on Jul. 7, 2020.

Written Opinion of the International Searching Authority from corresponding Patent Cooperation Treaty (PCT) Application No. PCT/EP2020/064399, indicated completed on Jul. 7, 2020.

\* cited by examiner

METHOD FOR PRODUCING A WELDED COMPONENT CONSISTING OF A FORMED HIGH-STRENGTH STEEL, AND A COMPONENT PRODUCED IN THIS MANNER

CROSS REFERENCE TO RELATED APPLICATION

The present application claims the priority benefits of International Patent Application No. PCT/EP2020/064399, filed May 25, 2020, and claims benefit of German patent application DE 10 2019 114 090.0, filed on May 27, 2019.

BACKGROUND AND FIELD OF THE INVENTION

The invention relates to a method for producing a welded component, in which a hot-rolled steel product consisting of high-strength steel with a material thickness of at least 1.5 mm is formed into a component and welded connections are then produced on the component by means of fusion welding. The invention also relates to a welded component, in which a hot-rolled steel product consisting of high-strength steel with a material thickness of at least 1.5 mm is formed into a component.

The fiercely competitive car market means that producers are constantly forced inter alia to find solutions for reducing vehicle fuel consumption whilst maintaining the highest possible level of comfort and the greatest possible level of passenger protection. On the one hand, the weight saving of all of the vehicle components plays a decisive role as does, on the other hand, the most favourable possible behaviour of the individual bodywork and chassis components in the event of high static and dynamic loading during operation and also in the event of a crash. The suppliers attempt to take this requirement into consideration in that by providing high-strength and super high-strength steels the wall thicknesses can be reduced whilst at the same time achieving improved component behaviour during manufacture thereof and during operation. Therefore, such steels must satisfy comparatively stringent requirements in terms of strength, extensibility, toughness, energy consumption, fatigue strength as well as operating strength and processability e.g. during cold-forming, welding and/or surface treatment.

Due to the high corrosion requirements, the surfaces of these steels must often be able to be finished with appropriate corrosion protection layers, e.g. consisting of zinc, wherein both conventional hot-dip galvanising and high-temperature galvanising are used.

In the past, conventional steels with relatively large sheet thicknesses, water-tempered high-strength fine-grain steels or multiphase steels have mostly been used for this field of application. The use of conventional steels is encumbered with the disadvantage of high component weight. Alternative super high-strength multiphase steels have disadvantages, such as poorer welding suitability and poorer formability due to the high basic hardness. Water-tempered steels are expensive to produce and are therefore often uneconomical. If these steels are subjected to subsequent thermal treatment, e.g. by welding, resulting in temperatures in the weld seam region of over Ac3 (ca. 900° C.), these steels lose their original strength. In the case of multiple heat treatments, such as e.g. intersecting weld seams in the corresponding heat-treated region, this phenomenon is repeated and so the steel steadily loses strength. In the case of high-strength multiphase steels, this loss of strength is even more pronounced after corresponding heat treatment because the original martensitic phase proportion is lost during heating above the conversion temperature Ac3 if cooling is not controlled and intensified. This is particularly disadvantageous in the case of dynamically stressed, welded chassis parts or chassis components, as this means that the required fatigue and operating strengths in accordance with the performance specification are no longer achieved. These components can be produced from steel strips or steel sheets or else from welded, e.g. high-frequency induction (HFI) welded pipes or even seamless pipes. Therefore, in terms of the invention, steel strips, steel sheets, welded or seamless pipes are summarised hereinafter as steel products.

For these reasons, air-hardening steel materials have been developed as an alternative to the known steels and overcome the disadvantages of the known steels in that the required material properties are now produced solely by cooling the steel in air, e.g. after heat treatment of the component. For these steels, good cold-formability (e.g. Rp0.2: <420 MPa at A80: >=25%) is achieved in the soft annealed state combined with a high strength and hardness of the formed component in the air-hardened state (e.g. Rm: >800 MPa). The heat treatment can be e.g. furnace heating or high-temperature galvanising.

In the case of a steel strip consisting of air-hardening steel, the steel cools down so quickly after hot-rolling, at least in sections in air, in particular in still air, that the air-hardening effect commences. In the prior art, it has hitherto been necessary to achieve cold-formability for the production of formed components by means of a downstream soft annealing process, e.g. in a batch-type annealing process or by means of homogenisation annealing. Alternatively, cold-formability can also be maintained after hot-rolling if a correspondingly tightly wound coil cools slowly, possibly in a special heat-insulated sheet metal box. The same applies to seamless hot-rolled pipes in the prior art, which are subjected to a soft annealing process after air cooling and hardening in order to restore cold-formability.

Patent publication document DE 102 21 487 A1 discloses the use of an air-hardening steel material for formed components in lightweight vehicle construction, with the main elements C (0.09-0.13 wt. %), Si (0.15-0.30 wt. %), Mn (1.10-1.60 wt. %), Cr (1.0-1.6 wt. %), Mo (0.30-0.60 wt. %) and V (0.12-0.25 wt. %), with the remainder being iron including typical associated elements.

Although this Cr—Mo—V-based alloy concept achieves the mechanical material properties required for said field of application in the air-hardened state as well as good tempering resistance and galvanising capability, the relatively high Cr content of 1.0-1.6 wt. % is a disadvantage here and can cause undesirable chromium carbide precipitations in the weld seam, in particular in the case of HFI welding frequently used for pipe production. These precipitations can lead to the formation of cracks in the weld seam during further processing of the welded pipe by forming or strong mechanical loading on the welded component during operation and can thus lead to premature failure of the component. Furthermore, the relatively high chromium content drives up costs.

Patent document EP 0 576 107 B1 discloses an air-hardening steel which has a lowered Cr content and is used for the production of seamlessly produced, non-galvanised structural pipes, e.g. as door reinforcement pipes in automotive engineering. The alloy concept based on Mn—Si—Ti—B has as main elements C (0.15-0.30 wt. %), Mn (2.05-3.35 wt. %), Si (0.50-0.80 wt. %), Cr (0.5-1.0 wt. %), Mo (max. 0.6 wt. %), Ti (0.01-0.05 wt. %), B (0.0015-

0.0035 wt. %) and N (0.002-0.015 wt. %), with the remainder being iron and typical associated elements.

The disadvantage of this steel which is known for seamless pipe production is that with this alloy concept the general weldability of the steel is restricted by the relatively high C and Mn contents and the galvanising capability by hot-dipping or high-temperature galvanising is very significantly restricted by the likewise relatively high Si content of up to 0.8 wt. %.

Furthermore, investigations have shown that the extensive tempering resistance of this known steel is also not guaranteed, especially due to the lack of vanadium, and so at higher temperatures, e.g. ≥550° C., as occur e.g. in high-temperature galvanising, the strength drops significantly below the required values for an air-hardened steel.

It is known that sufficient tempering resistance requires in particular the formation of a sufficient amount of Cr-, Mo- and/or V-carbides or carbonitrides, which prevent the sliding dislocations at elevated temperatures by precipitation on the grain boundaries. This procedure is also called secondary hardening.

Patent publication document DE 44 46 709 A1 discloses the use of an air-hardening steel for structural hollow profiles consisting of seamlessly hot-manufactured pipes, e.g. for door reinforcement elements. For this purpose, a steel alloy is used having the following main elements: C (0.17-0.28 wt. %), Mn (1.30-2.50 wt. %), Si (0.30-0.49 wt. %), Cr (≤0.49 wt. %), Mo (0.20-0.40 wt. %), Ni (0.05-0.19 wt. %), Ti (0.02-0.07 wt. %), B (0.0015-0.0050 wt. %), Nb (0.01-0.10 wt. %), V (0.01-0.10 wt. %) and N (s 0.015 wt. %), with the remainder being iron and typical associated elements. In addition, the total content of V+Nb+Ti must not exceed a value of 0.15 wt. %.

This alloy concept with additions of Nb and Ni is expensive for the requirements placed on an air-hardening steel and is problematic in terms of welding technology by reason of the relatively high C content. In addition, this steel has a silicon content of 0.30 to 0.49 wt. % which is critical for galvanising capability.

In the case of known alloy concepts, the cold-forming of air-hardenable steels to produce a component typically takes place in the soft-annealed state of the steel product in order to ensure sufficient cold-formability and to be able to produce components with demanding geometries.

According to the prior art, cold-forming is understood to mean the following process variants:

a) The direct production of corresponding components from soft hot strip by deep drawing or similar with subsequent possible tempering treatment to increase the component strength. A tempering treatment for an air-hardenable steel would consist of reheating the component after forming above the Ac3 temperature and cooling in air (air hardening) as well as annealing or tempering to an elevated temperature below the Ac3 temperature.

b) Further processing into pipes with corresponding drawing and annealing processes. The pipes themselves are then formed into components, e.g. by bending, internal high pressure forming (IHPF) or similar, and then tempered.

c) Further processing of the hot strip into cold strip with integrated (batch-type) annealing process. The cold strip is then processed by deep drawing or similar as under a).

All air-hardenable steels known e.g. from patent publication documents DE 10 2004 053 620 A1, DE 100 23 488 A1, DE 44 46 709 A1 or WO 2011/000351 A1, also have in common that after forming into a component, the higher-strength air-hardening state must then be reinstated by means of a subsequent heat treatment, e.g. by means of high-temperature galvanising. The forming itself can take place at room temperature or elevated temperature, e.g. up to Ac1 temperature (half warm) or up to Ac3 conversion temperature or above, if it seems technically necessary.

However, the production of welded components, such as e.g. chassis parts or chassis components, from a soft-annealed steel strip consisting of the known air-hardening steels is cost-intensive, since the steel strip as hot strip (hot-rolled state) or as cold strip (cold-rolled state) must be subjected to an additional heat treatment after hot-rolling or cold-rolling, as described above, to produce sufficient cold-formability for component production.

An additional heat treatment can lead to a considerable, unwanted dimensional distortion of the component, in particular in the case of flat components.

On the other hand, in the case of welded chassis components consisting of soft-annealed steel strip from air-hardening steel, the achievable fatigue strengths are still insufficient by reason of the above-described "softening" in the weld seam region caused by a drop in hardness and strength.

SUMMARY OF THE INVENTION

The present invention provides a method for producing a welded component, such as a dynamically stressed chassis component, consisting of a high-strength steel, with which the disadvantages mentioned are overcome, in particular with which comparable mechanical properties, in particular fatigue strengths, are achieved in the weld seam region as in the unaffected base material, preferably even with a higher strength than in the base material. A welded component with corresponding properties is also provided.

According to an aspect of the present invention, this object is achieved by a method, in which a hot-rolled steel product consisting of high-strength air-hardenable steel with a material thickness of at least 1.5 mm is initially produced, wherein the hot-rolled steel product has the following chemical composition in mass %:

C: 0.03 to 0.4, preferably 0.06 to 0.12, particularly preferably 0.08 to 0.10

Mn: 1.0 to 4.0, preferably 1.80 to 2.20, particularly preferably 1.80 to 2.00

Si: 0.09 to 2.0, preferably 0.22 to 0.34, particularly preferably 0.25 to 0.30

Al: 0.02 to 2.0, preferably 0.02 to 0.06, particularly preferably 0.02 to 0.05

P: <=0.1, preferably ≤0.020

S: <=0.1, preferably ≤0.010

N: 0.001 to 0.5, preferably 0.0030 to 0.0125, particularly preferably 0.0030 to 0.0080

Ti: 0.01 to 0.2, preferably 0.010 to 0.050, particularly preferably 0.020 to 0.030

Cr: 0.05 to 2.0, preferably 0.60 to 1.0, particularly preferably 0.70 to 0.80

B: 0.001 to 0.1, preferably 0.0015 to 0.0060, particularly preferably 0.0025 to 0.0035

Mo: 0.01 to 1.0, preferably 0.10 to 0.40, particularly preferably 0.15 to 0.30

V: 0.01 to 0.2, preferably 0.05 to 0.09, particularly preferably 0.05 to 0.08 optionally:

Ni: 0.02 to 1.0

Nb: 0.01 to 0.1 with the remainder being iron including typical steel-associated elements.

The hot-rolled steel product which is produced is then air-hardened and thereafter is directly formed into the component in the air-hardened state without the otherwise typically required soft annealing. As a last step, welded connections are produced by means of fusion welding on the component. A tempering treatment of the component, consisting of heating the entire component to temperatures above Ac3, cooling and tempering, does not take place.

In this way, a welded component is obtained in particular avoiding soft annealing before cold-forming and avoiding a final tempering treatment. In this context, it is pointed out that the final production of welded connections on the component is not to be understood as a tempering treatment. Although temperatures above the Ac3 temperature are reached at points in a locally defined manner around the weld seam during welding, these welded connections are not achieved to increase a strength of the entire component material in terms of a tempering treatment. In the context of range specifications in mass %, such as C: 0.03 to 0.4 mass %, the initial value and also the final value of the range are considered to be included.

The forming into a component can be carried out using the typical cold sheet forming methods, e.g. by means of deep drawing, folding, bending, roll-profiling or flanging.

According to a particular aspect of the present invention, the forming is carried out as cold-forming in the range of −5° C. to 40° C., and in a further particular aspect at room temperature in the range of 15° C. to 25° C. However, if it appears technically necessary, it can also be carried out at elevated temperatures up to the Ac temperature, up to the Ac3 temperature or above the Ac3 temperature up to 1000° C.

Preferably, the hot-rolled steel product before cold-forming has a minimum yield strength Rp0.2 of more than 450 MPa or even more than 600 MPa and/or a minimum tensile strength Rm of preferably 700 MPa or even more than 800 MPa. For the purposes of the invention, this is considered to be the definition of the property of high strength. Even in the air-hardened state, the hot-rolled steel product has an elongation at fracture A5 of at least 6%, preferably at least 13%.

Also provided is a welded component in accordance with a further aspect of the invention which is produced by cold-forming, from a hot-rolled steel product consisting of air-hardened high-strength steel having a material thickness of at least 1.5 mm, wherein the steel product has the following chemical composition in mass %:

C: 0.03 to 0.4, preferably 0.06 to 0.12, particularly preferably 0.08 to 0.10
Mn: 1.0 to 4.0, preferably 1.80 to 2.20, particularly preferably 1.80 to 2.00
Si: 0.09 to 2.0, preferably 0.22 to 0.34, particularly preferably 0.25 to 0.30
Al: 0.02 to 2.0, preferably 0.02 to 0.06, particularly preferably 0.05
P: <=0.1, preferably ≤0.020
S: <=0.1, preferably ≤0.010
N: 0.001 to 0.5, preferably 0.0030 to ≤0.0125, particularly preferably 0.0030 to 0.0080
Ti: 0.01 to 0.2, preferably 0.010 to ≤0.050, particularly preferably 0.020 to ≤0.030
Cr: 0.05 to 2.0, preferably 0.60 to ≤1.0, particularly preferably 0.70 to ≤0.80
B: 0.001 to 0.1, preferably 0.0015 to ≤0.0060, particularly preferably 0.0025 to ≤0.0035
Mo: 0.01 to 1.0, preferably 0.10 to ≤0.40, particularly preferably 0.15 to ≤0.30
V: 0.01 to 0.2, preferably 0.05 to ≤0.09, particularly preferably 0.05 to ≤0.08 optionally:
Ni: 0.02 to 1.0
Nb: 0.01 to 0.1 wherein the hot-rolled steel product in the air-hardened state has, before the cold-forming into a component, a minimum yield strength Rp0.2 of preferably 450 MPa or more than 600 MPa, a minimum tensile strength Rm of preferably 700 MPa or more than 800 MPa and/or an elongation at fracture A5 of at least 6%, preferably 13%.

Typical sheet thicknesses for the hot-rolled steel products in accordance with the invention are between 1.5 mm to 25 mm, preferably up to 15 mm.

All methods common in industrial manufacturing are used as fusion welding methods, such as beam welding, in particular laser beam welding, or metal arc welding methods, such as e.g. protective gas welding.

In a particular aspect of the invention, a hot-rolled steel strip or steel sheet for cold-forming is used to produce the component and has an air-hardened state after hot-rolling and cooling. Since the cold-formability of the hot-rolled and air-hardened steel strip or steel sheet is sufficiently high by reason of the alloy concept, soft annealing to produce sufficient cold-formability is thus no longer necessary and the production costs of the component are thus significantly reduced.

Surprisingly, investigations have shown that the air-hardenable steel in accordance with the invention has a sufficiently high cold-formability in the air-hardened state. Thus, elongations at fracture A5 of 13% and more were determined in the tests for sheet thicknesses of up to 25.0 mm. The hot-rolled steel products can be provided having a material thickness of 1.5 mm to 25.0 mm, preferably up to 15 mm, and thus cover the typical thickness spectrum in the chassis region.

Soft annealing of the steel product after hot-rolling can thus be dispensed with. The same applies to the cold-forming of hot-rolled seamless pipes to produce components.

In addition, the investigations of the mechanical properties of the welded component have shown that in the weld seam region the heat introduced during welding and the subsequent air cooling no longer soften the weld seam region, since the air-hardening properties of the steel prevent a drop in hardness and strength in this region, and preferably even increase hardness and strength. The mechanical properties and also the fatigue strength of welded chassis components are thus at least at a comparable level in the weld seam region and in the adjacent unaffected base material of the steel product. A comparable level is understood to be deviations between the base material and the weld seam region in the range of +−20% in relation to its tensile strength or hardness. Instead of only a comparable level, a higher level can also be achieved with values of up to +50% but also of up to +100%. This enables a higher stress transfer in the region of the heat-affected zone.

What is advantageous for achieving a high fatigue strength or operating strength is not only the preferably increased hardness of the weld seam region, but also the occurring, predominantly fine-grained bainitic microstructure for the heat-affected zone as well as for the weld seam or for the welding material, which is additionally dependent on the selected welding wire.

Advantageously, the hot-rolled steel product thus has a complex phase microstructure with a bainite content of more than 50%, preferably more than 80% and particularly preferably more than 90%. This microstructure advantageously also applies to the region of the heat-affected zone of the welded connection.

The invention is explained in more detail hereinafter using a test illustrated and evaluated in the figures.

DESCRIPTION OF THE PREFERRED EMBODIMENTS

Figure 1:
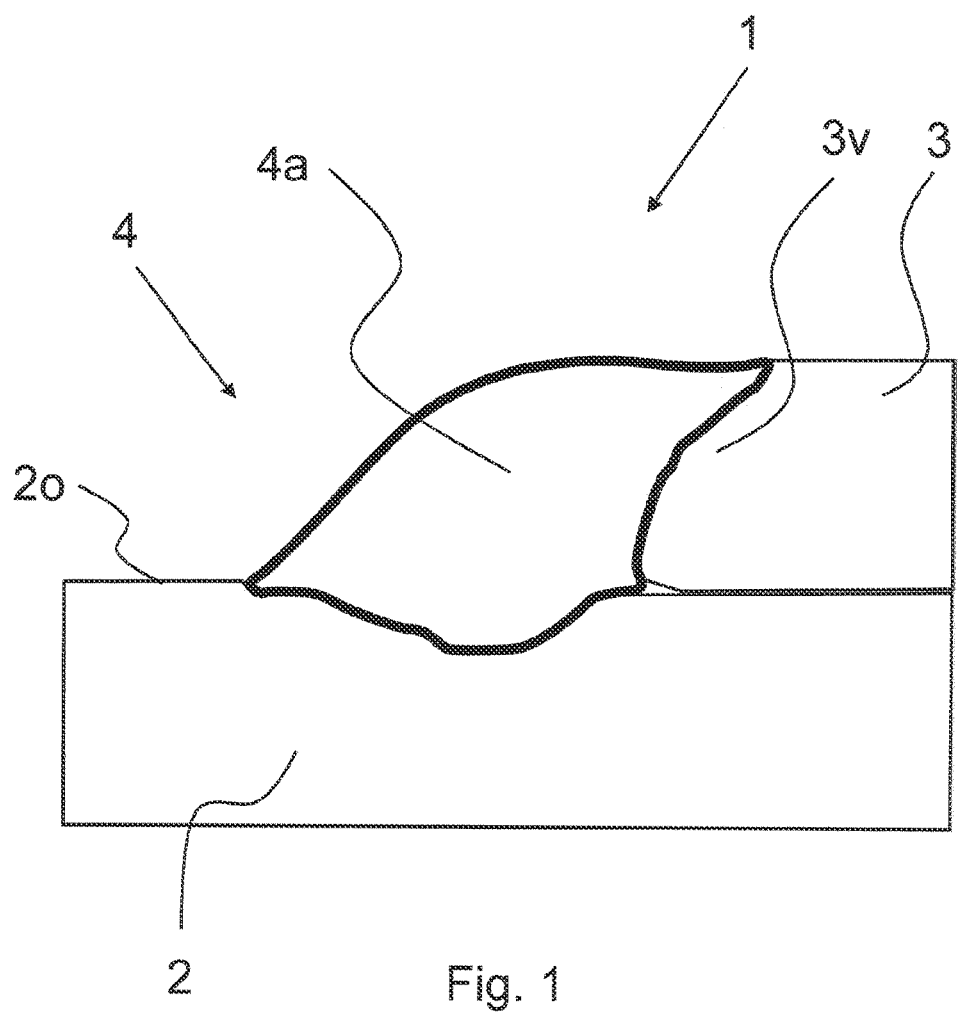
FIG. 1 shows a section of a welded component 1 in accordance with the invention in a lateral sectional view.

FIG. 1 shows a section of a welded component 1 in accordance with the invention in a lateral sectional view of a typical overlapping connection. The welded component 1 in the form of a chassis component consists essentially of a first lower steel product 2, in particular flat steel product, on which a further second upper steel product 3, in particular flat steel product, is placed partially covering it. The steel products 2, 3 each have a material thickness of 3 mm. The upper steel product 3 is connected to a surface 20 of the lower steel product 2 in the region of a front edge 3v via a welded connection 4 in the manner of an overlapping joint.

Figure 2:
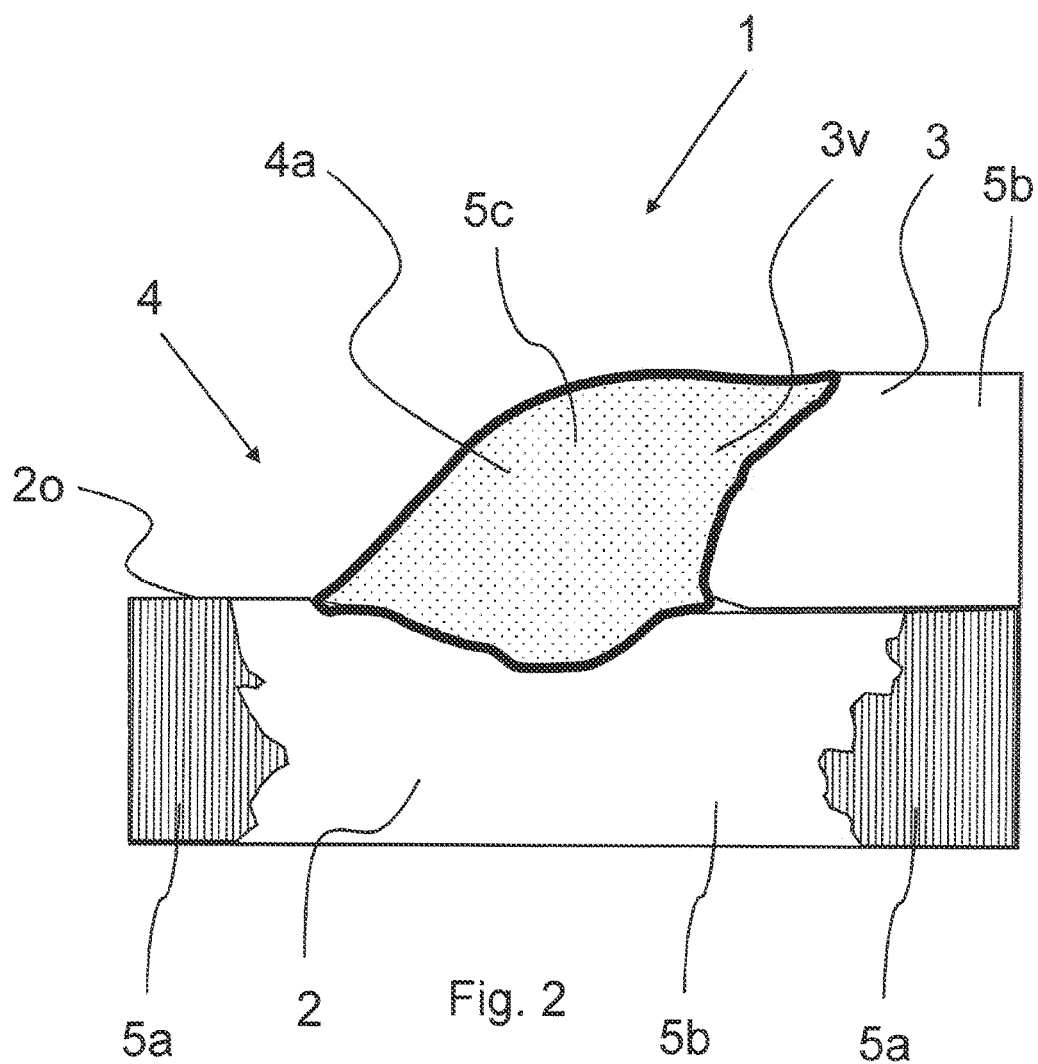
FIG. 2 shows the qualitative results of a grid-type hardness test over the section shown in FIG. 1.

FIG. 2 shows qualitatively the result of a grid-like hardness test over the entire illustrated section of the welded component 1. Starting from the hardness of the lower steel product 2 in the basic state, which is shown as the first hardness region 5a with vertical hatching, a heat-affected zone adjoins in the direction of the welding material 4a or the melt in the usual manner in the steel products 2, 3 and is shown as the second hardness region 5b without hatching or pattern. Based upon the air-hardening properties of the steel, the second hardness region 5b is hardened compared to the first hardness region 5a. The welding material 4a of the welded connection 4 has a third hardness region 5c which is characterised by a dot pattern. This third hardness region 5c is adjustable in relation to the hardness depending on the choice of welding wire and will typically be in a hardness region of the steel product 2, 3 in the basic state.

The determined measurement values for the first hardness region 5a are in the range of 280 to 320 HV 0.1, for the second hardness region 5b in the range of 430 to 470 HV 0.1 and for the third hardness region 5c in the range of 230 to 270 HV 0.1.

FIGS. 3 to 6 each show a microstructure-micrograph from different regions of the welded component 1. All microstructure-micrographs have been etched with nital in connection with sample preparation and are illustrated at a magnification of 1:500.

Figure 3:
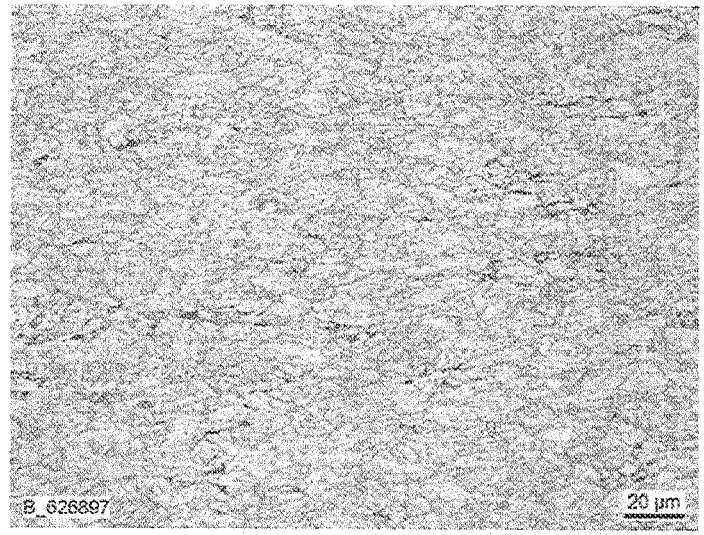
FIG. 3 shows a microstructure-micrograph of the region of the base material of the welded component 1.

FIG. 3 shows a microstructure-micrograph of the region of the base material of the welded component 1. At this location, a complex phase microstructure is present having 5% ferrite, 3% pearlite, 90% bainite and 2% martensite. The average ferrite grain size is 13.5 µm.

Figure 4:
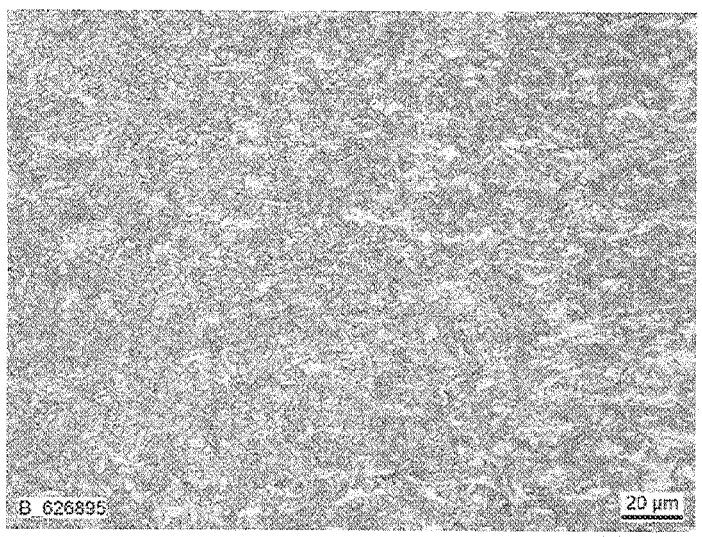
FIG. 4 shows a microstructure-micrograph of the region of the heat-affected zone of the welded component 1.

FIG. 4 shows a microstructure-micrograph of the region of the heat-affected zone of the welded component 1. A microstructure consisting of bainite with some ferrite can be seen. The average ferrite grain size is 13.5 µm.

Figure 5:
FIG. 5 shows a microstructure-micrograph of the region of the fusion line of the welded component 1.

FIG. 5 shows a microstructure-micrograph of the region of the fusion line of the welded component 1. At this location, the microstructure is 100% bainite.

Figure 6:
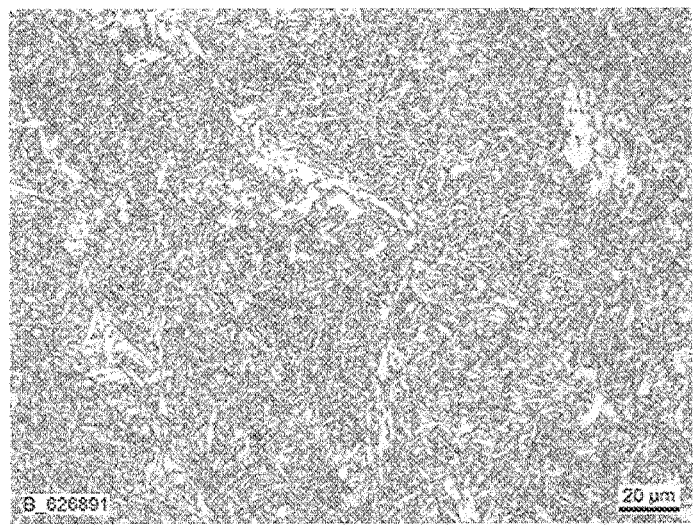
FIG. 6 shows a microstructure-micrograph of the region of the weld seam of the welded component 1.

FIG. 6 shows a microstructure-micrograph of the region of the weld seam 4a of the welded component 1. The microstructure which can be seen is bainite interspersed with a light network of ferrite and bainite.

As already explained above, the welded component 1 in accordance with the invention achieves a high fatigue strength or operating strength by reason of the predominantly fine-grained bainitic microstructure, which occurs in the region of the welded connection 4, for the heat-affected zone as well as for the weld seam 4a. The base material of the welded component is already present as a complex phase microstructure with a predominant proportion of bainite.

The inventive, high-strength, air-hardening steel for lightweight vehicle construction is likewise characterised by the fact that this alloy concept achieves excellent weldability in the case of the typical welding methods, such as e.g. protective gas welding, protective gas soldering or laser welding, without the disadvantages of known air-hardenable steels. High-frequency induction welding (HFI welding) is also unproblematic without the undesirable chromium carbide precipitations in the weld seam.

The content of C and Mn which is likewise reduced in comparison with the known air-hardening steel for seamless pipes ensures excellent general weldability with simultaneously excellent forming properties. At the same time, the lowered Si content ensures the galvanising capability of the steel and the addition of V ensures the tempering resistance.

The investigations have shown that the Cr content which is decisive for the air-hardening effect can be reduced to a value which is not critical for the avoidance of chromium carbide precipitations during HFI welding, if the air-hardenability of the steel is then improved at the same time by means of a complex alloy concept based on Cr—Mo—Ti—B.

In accordance with the invention, the alloy concept for the steel product is based on the knowledge that, in contrast to the known steel for seamless pipes, in which nitrogen must be completely bound by titanium in order to avoid boron nitride precipitations and thus ensure the effectiveness of the added boron, the nitrogen is also bound by other alloy elements such as Cr or Mo. It is therefore no longer absolutely necessary to determine an overstoichiometric titanium addition in relation to nitrogen. The addition of vanadium triggers precipitations of vanadium carbonitrides of the V(C,N) type at higher tempering temperatures, which counteract a drop in strength via secondary hardening.

However, the disadvantage of these alloy concepts based on Mn—Si—Ti—B is the excessively high Si content which is necessary to achieve high strength values but makes piece-galvanising more difficult. Moreover, from temperatures of ca. 550° C., the strength of the material drops significantly below the required values and so the tempering resistance is also not guaranteed.

On the basis of these findings, the inventive alloy concept already described above was determined, wherein the following analysis range in mass % turned out to be advantageous. The respective specifications for the analysis ranges can be fulfilled individually or in total:

C 0.06 to 0.12
Mn 1.8 to 2.20
Si 0.22 to 0.34
Al 0.02 to 0.06
P≤0.020
S≤0.010

N 0.0030 to 0.0125
Ti 0.010 to 0.050
Cr 0.60 to 1.0
B 0.0015 to 0.0060
Mo 0.10 to 0.40
V 0.05 to 0.09

Further advantageous processing and component properties are achieved when the following analysis range is observed in mass %:
C 0.08 to 0.10
Al 0.02 to 0.05
Si 0.25 to 0.30
Mn 1.80 to 2.00
P≤0.020
S≤0.010
N 0.0030 to 0.0080
Ti 0.020 to 0.030
Cr 0.70 to 0.80
B 0.0025 to 0.0035
Mo 0.15 to 0.30
V 0.05 to 0.08

The results show the high tempering resistance of the steel up to temperatures of 700° C.

As investigations on welded components consisting of the hot-rolled and air-hardened steel product in accordance with the invention have shown, this steel can be used advantageously not only in the automotive sector, but also in all fields of application in which good cold-formability in combination with high steel strengths or fatigue strengths and operating strengths under dynamic stress of welded components is required. Accordingly, the field of application for such components can be e.g. the automotive industry, in particular for chassis components, the construction equipment industry, the household appliance industry or chemical apparatus engineering. In the automotive industry, a use as a chassis component, bumper or cross member is conceivable.

The advantages of this air-hardening steel in accordance with the invention are listed once again hereinafter: very good cold-formability in the air-hardened state, very good weldability in the soft and air-hardened state, very good HFI weldability, can be coated effectively with the typical coating methods, such as cathodic dip coating (CDC), hot-dip galvanising and high-temperature galvanising, use for welded components subject to high static and dynamic loads, especially in the chassis of vehicles, cost-effective alloy concept.

The invention claimed is:

1. A method for producing a welded component, comprising:
   producing a hot-rolled steel product from a high-strength air-hardenable steel having a material thickness of at least 1.5 mm, wherein the hot-rolled steel product comprises a chemical composition in mass % as follows:
   C: 0.08 to 0.10,
   Mn: 1.80 to 2.00,
   Si: 0.25 to 0.30,
   Al: 0.02 to 0.05,
   P: ≤0.020,
   S: ≤0.010,
   N: 0.0030 to 0.0080,
   Ti: 0.020 to 0.030,
   Cr: 0.70 to 0.80,
   B: 0.0025 to 0.0035,
   Mo: 0.15 to 0.30,
   V: 0.05 to 0.08,
   with a remainder being iron including typical steel-associated elements,
   subsequently hardening solely by cooling in air the hot-rolled steel product produced, after which the hot-rolled, air-hardened steel product has a minimum yield strength Rp0.2 of 450 MPa, a minimum tensile strength Rm of 700 MPa and/or an elongation at fracture A5 of at least 6% and a complex phase microstructure with a banite content of more than 50%;
   forming the hot-rolled steel product in the air-hardened state into a component; and
   producing welded connections by fusion welding on the component.

2. The method of claim 1, wherein the hot-rolled steel product further comprises in mass % in said producing a hot-rolled steel product:
   Ni: 0.02 to 1.0,
   Nb: 0.01 to 0.1,
   with the remainder being iron including typical steel-associated elements.

3. The method of claim 1, wherein said method consists exclusively of the following steps:
   producing a hot-rolled steel product from a high-strength air-hardenable steel having a material thickness of at least 1.5 mm, wherein the hot-rolled steel product comprises the following chemical composition in mass %:
   C: 0.08 to 0.10,
   Mn: 1.80 to 2.00,
   Si: 0.25 to 0.30,
   Al: 0.02 to 0.05,
   P: ≤0.020,
   S: ≤0.010,
   N: 0.0030 to 0.0080,
   Ti: 0.020 to 0.030,
   Cr: 0.70 to 0.80,
   B: 0.0025 to 0.0035,
   Mo: 0.15 to 0.30,
   V: 0.05 to 0.08,
   with the remainder being iron including typical steel-associated elements,
   subsequently hardening solely by cooling in air the hot-rolled steel product produced, after which the hot-rolled, air-hardened steel product has a minimum yield strength Rp0.2 of 450 MPa, a minimum tensile strength Rm of 700 MPa and/or an elongation at fracture A5 of at least 6% and a complex phase microstructure with a banite content of more than 50%;
   forming the hot-rolled steel product in the air-hardened state into a component; and
   producing welded connections by fusion welding on the component.

4. The method as claimed in claim 1, wherein said forming is a conventional cold sheet forming method.

5. The method as claimed in claim 4, wherein the conventional cold sheet forming comprises deep drawing, folding, roll-profiling, bending or flanging.

6. The method as claimed in claim 1, wherein the forming is carried out at a temperature in a range of −5° C. to 40° C.

7. The method as claimed in claim 6, wherein the forming is carried out at room temperature in the range of 15° C. to 25° C.

8. The method as claimed in claim 1, wherein the fusion welding comprises metal arc welding or beam welding.

9. The method as claimed in claim 8, wherein the metal arc welding comprises protective gas welding, and wherein the beam welding comprises laser beam welding.

10. The method as claimed in claim 1, wherein the hot-rolled, air-hardened steel product has a complex phase microstructure with a bainite content of more than 80%.

11. The method as claimed in claim 1, wherein the hot-rolled, air-hardened steel product has a complex phase microstructure with a bainite content of more than 90%.

* * * * *

UNITED STATES PATENT AND TRADEMARK OFFICE
CERTIFICATE OF CORRECTION

PATENT NO. : 12,397,371 B2
APPLICATION NO. : 17/614204
DATED : August 26, 2025
INVENTOR(S) : Manuel Otto Page 1 of 1

It is certified that error appears in the above-identified patent and that said Letters Patent is hereby corrected as shown below:

In the Specification

Column 3
Line 30 "(s 0.015" should be --($\leq$ 0.015--

Column 5
Line 27 "Ac temperature" should be --Ac1 temperature--

Column 7
Line 30 "surface 20" should be --surface 2o--

Signed and Sealed this
Fourteenth Day of October, 2025

John A. Squires
*Director of the United States Patent and Trademark Office*